US007942581B2

(12) United States Patent
Leonardelli

(10) Patent No.: US 7,942,581 B2
(45) Date of Patent: May 17, 2011

(54) ANTI-FRICTION LAYER FOR A BEARING ELEMENT

(75) Inventor: Georg Leonardelli, Gmunden (AT)

(73) Assignee: Miba Gleitlager GmbH (AT)

( * ) Notice: Subject to any disclaimer, the term of this patent is extended or adjusted under 35 U.S.C. 154(b) by 840 days.

(21) Appl. No.: 11/832,934

(22) Filed: Aug. 2, 2007

(65) Prior Publication Data

US 2008/0159671 A1 Jul. 3, 2008

(30) Foreign Application Priority Data

Aug. 2, 2006 (AT) ................. A 1300/2006

(51) Int. Cl.
*F16C 33/02* (2006.01)
*F16C 17/00* (2006.01)
(52) U.S. Cl. ........................ 384/276; 384/129
(58) Field of Classification Search ............ 384/98, 384/100, 106–107, 125, 129, 220, 276, 280, 384/297, 322
See application file for complete search history.

(56) References Cited

U.S. PATENT DOCUMENTS

| | | | |
|---|---|---|---|
| 3,575,787 A | 4/1971 | Pietrocini et al. | |
| 3,584,656 A * | 6/1971 | Van Assendelet et al. | 138/141 |
| 3,808,130 A | 4/1974 | Sciefer et al. | |
| 4,099,804 A | 7/1978 | Baker et al. | |
| 4,129,550 A | 12/1978 | Nametkin et al. | |
| 4,172,622 A | 10/1979 | Baker et al. | |
| 4,193,645 A | 3/1980 | Baker et al. | |
| 4,394,275 A | 7/1983 | Bickle et al. | |
| 4,540,630 A | 9/1985 | Wegner et al. | |
| 4,577,379 A * | 3/1986 | Kramer | 29/898.055 |
| 4,618,270 A | 10/1986 | Kraus | |
| 4,623,590 A | 11/1986 | Hodes et al. | |
| 4,725,151 A * | 2/1988 | Orndorff, Jr. | 384/98 |
| 4,773,771 A * | 9/1988 | Kramer | 384/125 |
| 5,024,881 A | 6/1991 | Matucha et al. | |
| 5,024,882 A | 6/1991 | Matucha et al. | |
| 5,033,871 A * | 7/1991 | Ide | 384/125 |
| 5,518,318 A * | 5/1996 | Orndorff, Jr. | 384/98 |
| 5,525,246 A | 6/1996 | Kamiya et al. | |
| 5,573,846 A | 11/1996 | Harig et al. | |
| 5,932,049 A | 8/1999 | Orndorff, Jr. et al. | |
| 6,376,062 B1 | 4/2002 | Adam | |
| 6,406,184 B2 * | 6/2002 | Orndorff et al. | 384/98 |
| 6,485,735 B1 * | 11/2002 | Steen et al. | 424/423 |
| 6,528,143 B1 | 3/2003 | Adam et al. | |
| 6,726,994 B1 | 4/2004 | Araki et al. | |
| 6,866,421 B2 | 3/2005 | Tanaka et al. | |

(Continued)

FOREIGN PATENT DOCUMENTS

DE 20 00 632 A 7/1970

(Continued)

OTHER PUBLICATIONS

European Search Report, EP 07 01 4682.

*Primary Examiner* — Marcus Charles
(74) *Attorney, Agent, or Firm* — Lerner, David, Littenberg, Krumholz & Mentlik, LLP

(57) ABSTRACT

An anti-friction layer for a bearing element may comprise a synthetic polymer layer. The polymer layer comprises at least a first part-layer and a second part-layer of a different composition.

22 Claims, 1 Drawing Sheet

U.S. PATENT DOCUMENTS

| | | |
|---|---|---|
| 2003/0021981 A1 * | 1/2003 | Lu et al. .................. 428/317.9 |
| 2003/0185474 A1 | 10/2003 | Tanaka et al. |
| 2006/0029795 A1 | 2/2006 | Sawyer et al. |
| 2006/0182982 A1 * | 8/2006 | Arent et al. .................. 428/480 |
| 2008/0159671 A1 | 7/2008 | Leonardelli |

FOREIGN PATENT DOCUMENTS

| | | |
|---|---|---|
| DE | 2000632 | 7/1970 |
| DE | 22 06 400 A | 8/1973 |
| DE | 2206400 | 8/1973 |
| DE | 24 15 327 A | 1/1975 |
| DE | 2415327 | 1/1975 |
| DE | 25 04 833 A | 8/1975 |
| DE | 2504833 | 8/1975 |
| DE | 32 21 785 A | 1/1984 |
| DE | 3221785 | 1/1984 |
| DE | 33 43 309 A | 6/1985 |
| DE | 3343309 | 6/1985 |
| DE | 198 14 756 A | 3/1999 |
| DE | 19814756 | 3/1999 |
| EP | 0 044 577 A | 1/1982 |
| EP | 0044577 | 1/1982 |
| EP | 0060725 | 9/1982 |
| EP | 294931 | 12/1988 |
| EP | 0 340 838 A | 11/1989 |
| EP | 0 340 839 A | 11/1989 |
| EP | 0340838 | 11/1989 |
| EP | 0340839 | 11/1989 |
| EP | 060 725 A | 6/1994 |
| EP | 0 939 106 A | 9/1999 |
| EP | 0939106 | 9/1999 |
| EP | 0984 182 A | 3/2000 |
| EP | 0984182 | 3/2000 |
| EP | 1 236 914 A | 9/2002 |
| EP | 1236914 | 9/2002 |
| FR | 2133320 | 10/1972 |
| FR | 21 33 320 A | 11/1972 |
| GB | 1223910 | 3/1971 |
| GB | 1338234 | 11/1973 |
| GB | 1369975 A | 10/1974 |
| GB | 2196876 | 5/1988 |
| GB | 2 337 306 A | 11/1999 |
| GB | 2337306 | 11/1999 |
| GB | GP 2337306 A * | 11/1999 |
| GB | 2 384 033 B | 7/2003 |
| GB | 2384033 | 2/2004 |
| JP | 53-007780 | 1/1978 |
| JP | 53-007780 A | 1/1978 |
| JP | 60001424 | 1/1985 |
| JP | 04-83914 A | 2/1992 |
| JP | 04083914 | 3/1992 |
| JP | 60-1424 A | 1/1994 |
| JP | 07-247493 A | 9/1995 |
| JP | 07247493 | 9/1995 |
| JP | 09-79262 A | 3/1997 |
| JP | 09079262 | 3/1997 |
| JP | 2000192961 A * | 7/2000 |
| JP | 2001173644 | 6/2001 |
| JP | 2001343022 A * | 12/2001 |
| JP | 2001/173644 A | 12/2002 |
| JP | 2006170239 A * | 6/2006 |
| KR | 20010109478 | 12/2001 |
| KR | 20040100300 A | 12/2004 |
| KR | 20060021117 A | 3/2006 |
| RU | 2202716 C2 | 4/2003 |
| SU | 553124 | 4/1977 |
| WO | 9706768 | 2/1997 |
| WO | WO97/38046 | 10/1997 |
| WO | WO 97/38046 A | 10/1997 |

* cited by examiner

ANTI-FRICTION LAYER FOR A BEARING ELEMENT

CROSS-REFERENCE TO RELATED APPLICATIONS

This application claims priority under 35 USC 119 from Austrian Patent Application A 1300/2006 filed Aug. 2, 2006, which disclosure is incorporated herein by reference in its entirety.

FIELD OF INVENTION

The invention relates to an anti-friction layer for a bearing element, more particularly, a synthetic polymeric layer combined with a supporting metal layer.

BACKGROUND

All references cited in this specification, and their references, are incorporated by reference herein in their entirety where appropriate for teachings of additional or alternative details, features, and/or technical background.

The invention relates to an anti-friction layer for a bearing element, in particular a plain bearing, comprising a synthetic polymer layer, in particular a resin or lacquer layer, as well as a bearing element, in particular a plain bearing, with a supporting metal layer, a bearing metal layer disposed on top and an anti-friction layer disposed on top of it. Coatings used on components and surfaces subjected to tribological stress are required to meet a whole range of demands. Firstly, it is desirable to obtain a coating with as low friction as possible, which is relatively soft and therefore able to adapt to wear-induced abrasion as well as the bearing partner effectively. At the same time, it is necessary to obtain sufficiently high mechanical stability and strength, so as to withstand static as well as dynamic vibration stress, thereby increasing durability and service life.

Developments in the engine-building industry are tending towards higher specific performance, with a view to increasing the efficiency of internal combustion engines, and hence economic aspects and environmental compatibility, especially due to increasingly more stringent exhaust gas standards. Various components of an internal combustion engine are affected by this development, for example radial bearings which are subjected to a very high degree of stress, for example due to the very high torques and constantly increasing ignition pressures needed to optimise the combustion process, for example in direct-injection turbo-diesel engines. Due to the high-performance injection systems of these engines, the components of the injection pumps and their measuring instruments are exposed to these high stresses, as are other components such as rams, pins or rollers involved in friction pairings, due to the higher performance required. Aluminum alloys are often used for these components because they basically offer a good compromise between the properties which can be achieved and the costs involved.

More recent developments in this field have led to a more widespread use of so-called anti-friction lacquers—although, in principle, they have already been used in this field for many years.

REFERENCES

For example, patent specification DE 22 06 400 A describes a composite material comprising a metal support body and an anti-friction layer made from plastics capable of withstanding high stress, applied to the support body by means of adhesive, which contains heat-cured polyimide resins and additives to improve the running properties of the bearing, such as polytetrafluoroethylene, metal bearing alloys or similar. This being the case, the anti-friction layer may contain between 70 and 20% by weight of heat-cured polyimide resins and approximately 30 to 80% by weight of self-lubricating additives. Graphite, molybdenum sulphide and oxides are mentioned as self-lubricating additives.

Patent specification EP 0 939 106 A discloses an anti-friction layer material, which contains PTFE or PTFE as a matrix material in combination with other fluoro-thermoplastic materials, the melting point of which is above 260° C., and it also contains at least one powdered polyaramide, the proportion of which by reference to the total quantity of PTFE or the mixture of PTFE and other fluoro-thermoplastic materials and the polyaramide is 10 to 50% by volume.

Patent specification EP 1 236 914 A also describes a plain bearing, which has a resin coating on a bearing metal layer, and the resin coating contains a heat-curable resin with specific physical properties in a quantity of 70 to 30% by volume displaced with self-lubricating additives in a quantity of 30 to 70% by volume, and the Vickers hardness is no higher than 20. The resin may be a polyamide imide resin, for example. Molybdenum sulphide, graphite, boron nitride, tungsten disulphide, polytetrafluoroethylene, lead etc., are mentioned as self-lubricating additives.

Polymers which may be used as a coating material for bearing elements are also described in the following documents: U.S. Pat. No. 5,525,246 A, JP 60-1424 A, EP 0 984 182 A, JP 04-83914 A, IP 07-247493 A, GB 2 337 306 A, JP 09-79262 A, JP 2001/173644 A, DE 20 00 632 A, DE 33 43 309 A, DE 32 21 785 A, WO 97/38046 A, EP 0 340 839 A, EP 0 044 577 A, EP 0 340 838 A, DE 24 15 327 A, EP 060 725 A, DE 198 14 756 A, U.S. Pat. No. 4,618,270 A, DE 25 04 833 A, FR 21 33 320 A, GB 2 384 033 B, JP 53-007780 A.

It is therefore the objective of this invention is to improve an anti-friction layer made from a synthetic polymer layer for a bearing element so that it is able to withstand higher stress.

SUMMARY

This objective is achieved by the invention due to the fact that the synthetic polymer layer of the anti-friction layer comprises several part-layers, in particular at least two, and these part-layers are of a different composition. The advantage of this is that the requirements placed on such anti-friction layers no longer have to be satisfied by a single part-layer and instead these requirements can be split between at least two part-layers, in which case each part-layer may be formulated so that it is better able to satisfy the required profile. It is therefore possible to formulate the entire anti-friction layer so that when one of the part-layers has worn away, the respective part-layer lying underneath is able to assume at least part of this function even though it is intended to satisfy a different required profile within the overall structure of the anti-friction layer based on the thinking behind the invention. As a result, bearing elements provided with the synthetic anti-friction layers will have a longer service life.

Aspects disclosed herein include that the first part-layer of the anti-friction layer may be harder than the second part-layer, as a result of which the latter can be adapted for components which have to be mounted, such as shafts for example, and so that it is able to embed particles caused by abrasion, whereas the first part-layer is more wear-resistant and may have a higher resistance to abrasion. Due to the higher hardness of the first part-layer, higher cavitation resistance is also obtained. At the same time, the softer second part-layer enables better local adaptability of the anti-friction layer itself.

In terms of achieving resistance to high mechanical stress, it is of advantage if the first part-layer has a Vickers hardness selected from a range with a lower limit of HV2 35 and an upper limit of HV2 60.

Alternatively, in order to improve the capacity to embed, the second part-layer may have a Vickers hardness selected from a range with a lower limit of HV2 25 and an upper limit of HV2 45.

In order to increase the hardness of the first part-layer, it may contain at least one hard substance, which in turn is able to increase the resistance to abrasion and strength of the first part-layer.

Since the functions of the anti-friction layer are split between several part-layers, it may be that the first part-layer contains the hard material in a quantity selected from a range with a lower limit of 5% by weight, in particular 10% by weight, for example 15% by weight, and an upper limit of 50% by weight, in particular 45% by weight, for example 40% by weight, in other words it contains a higher proportion of hard material than known anti-friction coatings made up of synthetic polymer layers.

However, the second part-layer may also contain a hard material in order to impart a certain degree of resistance to it, in which case the proportion is selected from a range with a lower limit of 2% by weight, in particular 5% by weight, for example 10% by weight, and an upper limit of 50% by weight, in particular 40% by weight, for example 30% by weight.

This hard material may be selected from a group comprising hard materials such as $CrO_3$, $Fe_3O_4$, PbO, ZnO, CdO, $Al_2O_3$, SiC, $Si_3N_4$, $SiO_2$, MnO, $Si_3N_4$, clay, talc, $TiO_2$, aluminum silicates, such as for example mullite, magnesium silicates, such as for example amosite, antophyllite, chrysotile, spheroidal carbon, carbides, such as for example $CaC_2$, $Mo_2C$, WC, metal particles, such as for example Zn, Ag, Ba, Bi, bronze, Cd, Co, Cu, In, Pb, Sn, Tl, lead-tin alloy particles, bearing metal particles with a base of Pb or Sn, AlN, $Fe_3P$, metal borides, such as for example $Fe_2B$, $Ni_2B$, FeB, $BaSO_4$, metal sulphides, such as for example ZnS, $Ag_2S$, CuS, FeS, $FeS_2$, $Sb_2S_3$, PbS, $Bi_2S_3$, CdS, $WS_2$, chlorinated hydrogen carbonates, fluorides, such as for example $CaF_2$, metal fluorides, such as for example $PbF_2$, carbon-based fluorides ($CF_x$), metal oxy-fluorides, crocidolite, tremolite, molybdenum thio-carbamates, silicides, thio-phosphates, such as for example zinc thio-phosphate.

Also possible are mixtures of different hard materials, for example comprising two, three or four or more different hard materials. Possibilities include, for example, $CrO_3$ and/or $Fe_3O_4$ and/or PbO and/or ZnO and/or CdO and/or $Al_2O_3$ and/or SiC and/or $Si_3N_4$ and/or $SiO_2$ and/or MnO and/or $Si_3N_4$ and/or clay and/or talc and/or $TiO_2$ and/or aluminum silicates, such as for example mullite, and/or magnesium silicates, such as for example amosite, antophyllite and/or chrysotile and/or spheroidal carbon and/or carbides, such as for example $CaC_2$, $Mo_2C$ and/or WC and/or metal particles, such as for example Zn, Ag, Ba, Bi, bronze, Cd, Co, Cu, In, Pb, Sn, Tl, lead-tin alloy particles, bearing metal particles with a base of Pb or Sn, and/or AlN and/or $Fe_3P$ and/or metal borides, such as for example $Fe_2B$, $Ni_2B$, FeB and/or $BaSO_4$ and/or metal sulphides, such as for example ZnS, $Ag_2S$, CuS, FeS, $FeS_2$, $Sb_2S_3$, PbS, $Bi_2S_3$, CdS, $WS_2$ and/or chlorinated hydrogen carbonates and/or fluorides, such as for example $CF_2$ and/or metal fluorides, such as for example $PbF_2$, and/or metal oxy-fluorides and/or crocidolite and/or tremolite and/or molybdenum thio-carbamates and/or silicides and/or thio-phosphates, such as for example zinc thio-phosphate, with $CrO_3$ and/or $Fe_3O_4$ and/or PbO and/or ZnO and/or CdO and/or $Al_2O_3$ and/or SiC and/or $Si_3N_4$ and/or $SiO_2$ and/or MnO and/or $Si_3N_4$ and/or clay and/or talc and/or $TiO_2$ and/or aluminum silicates, such as for example mullite, magnesium silicates, such as for example amosite, antophyllite and/or chrysotile and/or spheroidal carbon and/or carbides, such as for example $CaC_2$, $Mo_2C$ and/or WC and/or metal particles, such as for example Zn, Ag, Ba, Bi, bronze, Cd, Co, Cu, In, Pb, Sn, Tl, lead-tin alloy particles, bearing metal particles with a base of Pb or Sn, and/or AlN and/or $Fe_3P$ and/or metal borides, such as for example $Fe_2B$, $Ni_2B$, FeB and/or $BaSO_4$ and/or metal sulphides, such as for example ZnS, $Ag_2S$, CuS, FeS, $FeS_2$, $Sb_2S_3$, PbS, $Bi_2S_3$, CdS, $WS_2$ and/or chlorinated hydrogen carbonates and/or fluorides, such as for example $CF_2$ and/or metal fluorides, such as for example $PbF_2$, and/or metal oxy-fluorides and/or crocidolite and/or tremolite and/or molybdenum thio-carbamates and/or silicides and/or thio-phosphates, such as for example zinc thio-phosphate.

In another embodiment of the anti-friction layer, the first and/or second part-layer contain fibers, in particular inorganic fibers, such as for example glass, carbon, asbestos, potassium titanate, whiskers, such as for example SiC, metal fibers, for example made from Cu or steel, filaments with hard metal cores. These fibers also strengthen the matrix, and a higher or lower matrix strength is achieved depending on the proportion of fibers in the synthetic layer.

In this respect, it is of advantage if the first part-layer which is harder contains a higher proportion of fibers so that the second part-layer is softer and in turn has a higher embedding capacity or adaptability.

Here too, it is possible to use mixtures of different fibers, for example glass and/or carbon and/or asbestos and/or potassium titanate and/or SiC and/or metal fibers of copper and/or metal fibers of steel and/or filaments with hard metal cores containing fibers of glass and/or carbon and/or asbestos and/or potassium titanate and/or SiC and/or metal fibers of copper and/or metal fibers of steel and/or filaments with hard metal cores.

In order to achieve the above-mentioned properties, it is of advantage if the proportion of fibers is selected from a range with a lower limit of 5% by weight, in particular 7% by weight, for example 9% by weight, and an upper limit of 20% by weight, in particular 15% by weight, for example 12% by weight.

In terms of embedding capacity, it is of advantage if the proportion of fibers in the second part-layer, if it contains any, is selected from a range with a lower limit of 0.05% by weight, in particular 1% by weight, for example 3% by weight, and an upper limit of 10% by weight, in particular 7% by weight, for example 5% by weight.

The component to be mounted, for example the shaft, is in direct contact with the second part-layer, and it is of advantage if this second part-layer contains a solid lubricant. Another option is for the first, harder part-layer to contain a solid lubricant as well, so that if the second softer part-layer becomes locally worn, the anti-friction layer continues to exhibit a certain ability to slide. In this respect, it is of advantage if the proportion of the at least one solid lubricant is selected from a range with a lower limit of 5% by weight, in particular 7% by weight, for example 9% by weight, and an upper limit of 20% by weight, in particular 15% by weight, for example 12% by weight, thereby enabling the best effect to be obtained in terms of the combination or hardness and lubricating capacity.

By contrast, it is preferably if the proportion of the at least one solid lubricant in the second part-layer is higher, in which case this second part-layer is not only softer but also has a higher lubricating capacity, and it is therefore of advantage if this proportion is selected from a range with a lower limit of 15% by weight, in particular 20% by weight, for example 25% by weight, and an upper limit of 50% by weight, in particular 40% by weight, for example 30% by weight.

The solid lubricant is preferably selected from a group comprising $MoS_2$, h-BN, $WS_2$, graphite, polytetrafluoroethylene, Pb, Pb—Sn-alloys, $CF_2$, $PbF_2$.

In this case too, it is possible to opt for mixtures of several solid lubricants, for example the first and/or second part-layer may contain mixtures of $MoS_2$ and/or h-BN and/or $WS_2$ and/or graphite and/or polytetrafluoroethylene and/or Pb and/or Pb—Sn-alloys and/or $CF_2$ and/or $PbF_2$ with $MoS_2$ and/or h-BN and/or $WS_2$ and/or graphite and/or polytetrafluoroethylene and/or Pb and/or Pb—Sn-alloys and/or $CF_2$ and/or $PbF_2$.

The first a the second part-layer may be made from the same polymer, in which case they may contain different proportions of hard materials and/or solid lubricants and/or other additives. However, it would also be possible for the first part-layer to be made from a different polymer than the second part-layer, in which case the effects, such as for example adaptability, resistance, hardness, etc., will be further enhanced. In this respect, the expression "different polymer" should also be construed as meaning identical polymers which differ solely due to different dispositions of the polymer chains or residues on the polymer chains, such as for example tactical, atactical, syndiotactical, etc., since these polymers may also have different properties from one another.

By preference, the polymer of the first and/or second part-layer is selected from a group comprising polytetrafluoroethylene, resins containing fluorines, such as for example perfluoro-alkoxy copolymers, polyfluoro-alkoxy polytetrafluoroethylene copolymers, ethylene-tetrafluoroethylene, poly-chlorotrifluoroethylene, fluorinated ethylene-propylene copolymers, polyvinyl fluoride, polyvinylidene fluoride, alternating copolymers, statistical copolymers, such as for example perfluoroethylene propylene, polyester imides, bismaleimides, polyimide resins, such as for example carboran imides, aromatic polyimide resins, hydrogen-free polyimide resins, poly-triazo-pyromellithimides, polyamide imides, in particular aromatic, polyarylether imides, optionally modified with isocyanates, polyether imides, optionally modified with isocyanates, epoxy resins, epoxy resin esters, phenolic resins, polyamide 6, polyamide 66, polyoxymethylene, silicones, polyaryl ethers, polyaryl ketones, polyaryl ether ketones, polyaryl ether-ether ketones, polyether-ether ketones, polyether ketones, polyvinylidene difluorides, polyethylene sulfides, allylene sulfide, poly-triazo-pyromellithimides, polyester imides, polyaryl sulfides, polyvinylene sulfides, polyphenylene sulfides, polysulfones, polyether sulfones, polyaryl sulfones, polyaryl oxides, polyaryl sulfides, nitrile rubber, fluorine-based rubbers, as well as copolymers thereof.

It is also possible to use mixtures of several polymers for the first and/or second part-layer, for example polytetrafluoroethylene and/or resins containing fluorine, such as for example perfluoroalkoxy copolymers, polyfluoro-alkoxy polytetrafluoroethylene copolymers and/or ethylene-tetrafluoroethylene and/or polychlorotrifluoroethylene and/or fluorinated ethylene-propylene copolymers and/or polyvinyl fluoride and/or polyvinylidene fluoride and/or alternating copolymers and/or statistical copolymers, such as for example perfluoroethylene propylene, polyester imides and/or bismaleimides and/or polyimide resins, such as for example carboran imides and/or aromatic polyimide resins and/or hydrogen-free polyimide resins and/or poly-triazo-pyromellithimides and/or polyamide imides, in particular aromatic polyarylether imides, optionally modified with isocyanates, and/or polyether imides, optionally modified with isocyanates, and/or epoxy resins and/or epoxy resin esters and/or phenolic resins and/or polyamide 6 and/or polyamide 66 and/or polyoxymethylenes and/or silicones and/or polyaryl ethers and/or polyaryl ketones and/or polyaryl ether ketones and/or polyaryl ether-ether ketones and/or polyether-ether ketones and/or polyether ketones and/or polyvinylidene difluorides and/or polyethylene sulfides and/or allylene sulfides and/or poly-triazo-pyromellithimides and/or polyester imides and/or polyaryl sulfides and/or polyvinylene sulfides and/or polyphenylene sulfides and/or polysulfones and/or polyether sulfones and/or polyaryl sulfones and/or polyaryl oxides and/or polyaryl sulfides and/or nitrile rubber and/or fluorine-based rubbers with polytetrafluoroethylene and/or resins containing fluorine, such as for example perfluoro-alkoxy copolymers, polyfluoro-alkoxy polytetrafluoroethylene copolymers and/or ethylene-tetrafluoroethylene and/or polychloro-trifluoroethylene and/or fluorinated ethylene-propylene copolymers and/or polyvinyl fluoride and/or polyvinylidene fluoride and/or alternating copolymers and/or statistical copolymers, such as for example perfluoroethylene propylene, polyester imides and/or bismaleimides and/or polyimide resins, such as for example carboran imides and/or aromatic polyimide resins and/or hydrogen-free polyimide resins and/or poly-triazo-pyromellithimides and/or polyamide imides, in particular aromatic polyarylether imides, optionally modified with isocyanates, and/or polyether imides, optionally modified with isocyanates, and/or epoxy resins and/or epoxy resins esters and/or phenolic resins and/or polyamide 6 and/or polyamide 66 and/or polyoxymethylenes and/or silicones and/or polyaryl ethers and/or polyaryl ketones and/or polyaryl ether ketones and/or polyaryl ether-ether ketones and/or polyether-ether ketones and/or polyether ketones and/or polyvinylidene difluorides and/or polyethylene sulfides and/or allylene sulfides and/or poly-triazo-pyromellithimides and/or polyester imides and/or polyaryl sulfides and/or polyvinylene sulfides and/or polyphenylene sulphides and/or polysulfones and/or polyether sulfones and/or polyaryl sulfones and/or polyaryl oxides and/or polyaryl sulfides and/or nitrile rubber and/or fluorine-based rubbers.

If two or more polymers are used in one of the part-layers, they may form a penetration network, in which each polymer is present in the form of a network. To this end, the polymers may be produced or cross-linked together, i.e. in the presence of the respective other one. The polymers should have a similar reaction kinetic.

The proportion of solid lubricant in the first part-layer may increase in the direction towards the second part-layer, as a result of which the first part-layer becomes softer in the direction towards the second part-layer, and the lowest hardness is disposed in the region of the interface with the second part-layer so that even if the second part-layer is subject to local wear, the first part-layer will result in a better sliding capacity compared with the embodiment mentioned above.

It is also possible for the proportion of hard material in the first part-layer to decrease in the direction towards the second part-layer, as a result of which the first part-layer will have the lowest hardness in the region of the interface with the second part-layer, thereby resulting in a higher adaptability and capacity to embed in this interface region.

For the same purpose, it is also possible for the proportion of hard material in the second part-layer to increase in the direction towards the first part-layer so that the second part-layer has a higher resistance in the lower areas of the layer and will thus be able to assume part of the function of the first part-layer to a certain extent.

In order to increase sliding capacity in the region of the interface with the component to be mounted, the solid lubricant in the second part-layer may decrease in the direction towards the first part-layer, in other words the highest proportion of solid lubricant is in the region of a shaft.

To this end, the first part-layer and/or second part-layer may be made up of several individual layers of a different composition within the meaning described above, for example in the first part-layer, the proportion of hard material decreases in steps in the direction towards the second part-layer and the concentration of solid lubricant increases in this direction and in the second part-layer, the proportion of hard material increases in steps in the direction towards the first part-layer and the proportion of solid lubricant decreases in this direction.

Although it is not absolutely necessary, in principle, to provide adhesion-imparting agents between the individual layers of the anti-friction layer because the adhesive capacity of the individual polymer layers is sufficient, it is nevertheless possible to provide an adhesion-imparting agent between the at least two individual layers of the part-layers or between the part-layers to increase adhesive strength. This prevents an individual part-layer from becoming detached from another, at least locally.

Finally, the objective is also achieved by the invention on the basis of a bearing element provided with the anti-friction layer proposed by the invention, in which case the first part-layer is disposed between the second part-layer and the bearing metal layer, in other words the second part-layer is disposed in the region of the component to be mounted.

To provide a clearer understanding of the invention, it will be explained in more detail below with references to examples illustrated in the appended drawings.

BRIEF DESCRIPTION OF THE DRAWINGS

The drawings provide highly simplified, schematic illustrations as follows.

DETAILED DESCRIPTION

Figure 1:
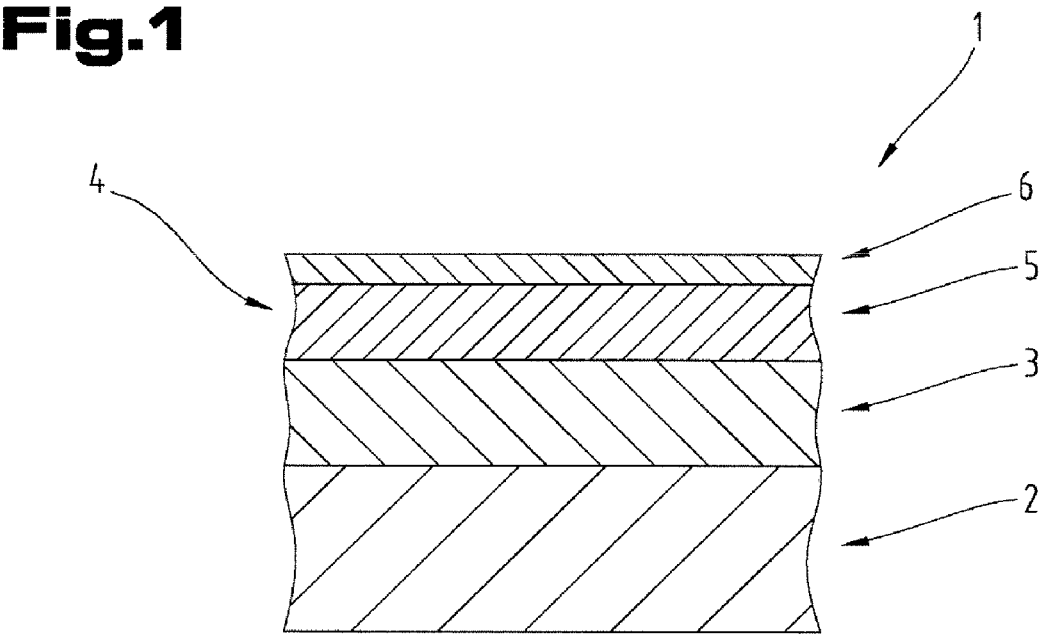
FIG. 1 shows a first embodiment of a bearing element.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

FIG. 1 shows a bearing element 1, comprising a supporting metal layer 2, a bearing metal layer 3 disposed on top of it and, disposed on top of the latter, an anti-friction layer 4 which in this particular embodiment comprises a first part-layer 5 formed on the bearing metal layer 3 and a second part-layer 6 applied on top of the first part-layer 5, which will sit in contact with a shaft, for example, although this is not illustrated.

The supporting metal layer 2 is usually made from steel but may naturally also be made from similar materials which impart the requisite structural strength to the bearing element 1.

As a bearing metal layer 3, all known bearing metals used for such bearing elements and known from the prior art may be used. Examples of these are as follows:

1. Bearing Metals with an Aluminum Base (Partially Conforming to DIN ISO 4381 and 4383):
AlSn6CuNi, AlSn20Cu, AlSi4Cd, AlCd3CuNi, AlS11Cu, AlSn6Cu, AlSn40, AlSn25CuMn, AlSi11CuMgNi;

2. Bearing Metals with a Copper Base (Partially Conforming to DIN ISO 4383):
CuSn10, CuAl10Fe5Ni5, CuZn31Si1, CuPb24Sn2, CuSn8Bi10;

3. Bearing Metals with a Tin Base:
SnSb8Cu4, SnSb12Cu6Pb.

The first part-layer 5 and the second part-layer 6 are formed as explained above.

The bearing element 1 may take the form of a plain bearing, for example a plain bearing half-shell, whilst other designs based on a full structure or direct coatings are also possible, such as for example connecting rods, in particular connecting rod eyes, in which case the direct coating on the bearing metal layer 3 may be dispensed with under certain circumstances. However, the invention also includes other applications, for example designs based on thrust washers or similar. In principle, the invention may be used for all bearing elements 1 for which tribological properties are necessary.

Figure 2:
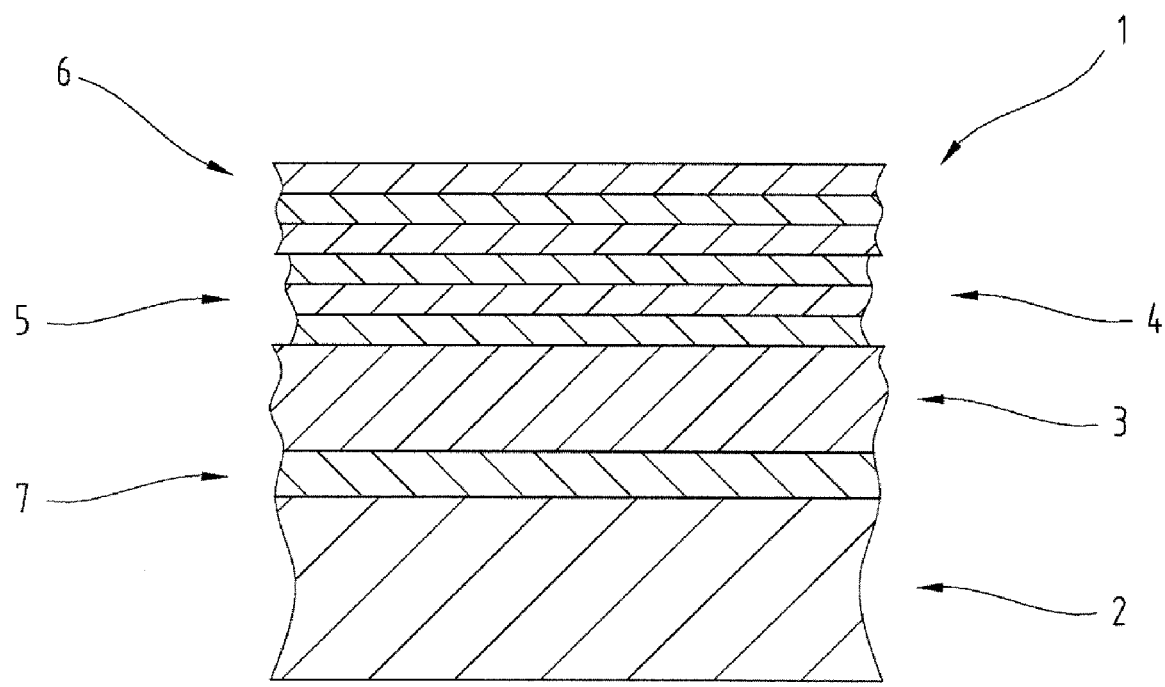
FIG. 2 shows another embodiment of the layered structure of a bearing element.

FIG. 2 illustrates a different multi-layered structure of the bearing element 1. It again comprises the externally lying supporting metal layer 2, the bearing metal layer 3 and the anti-friction layer 4.

In this embodiment, an intermediate layer 7 is disposed between the supporting metal layer 2 and the bearing metal layer 3, which may be provided in the form of a binding layer. The use of such binding layers for plain bearings is known from the prior art and they are usually made from pure aluminum, aluminum alloys, in particular an aluminum alloy with scandium, etc. The intermediate layer 7 may also be provided as a diffusion barrier layer, for example as a nickel, copper or silver barrier or similar.

Naturally, it would also be possible to provide several of these intermediate layers 7, for example both binding and diffusion barrier layers.

In this embodiment, the anti-friction layer 4 again comprises the first part-layer 5 and the second part-layer 6, in which case both the first part-layer 5 and the second part-layer 6 are made up of several individual layers, as described above, and this will not be described again in order to avoid repetition.

In all the embodiments of the invention, the intermediate layer, although not illustrated, may naturally be provided between the anti-friction layer 4 and the bearing metal layer 3, for example in the form of binding layers and/or diffusion barrier layers.

At least one adhesion-imparting layer may also be provided between the layers of the first part-layer 5 and/or second part-layer 6 in at least certain regions, as explained above.

Primers may be used as the adhesion-imparting layers, for example.

The first part-layer 5 may have a layer thickness selected from a range with a lower limit of 3 μm and an upper limit of 20 μm.

The second part-layer 6 may also have a layer thickness selected from a range with a lower limit of 3 μm and an upper limit of 20 μm.

The individual layers of the first part-layer 5 and the second part-layer 6 may have a layer thickness selected from a range with a lower limit of 3 μm and an upper limit of 10 μm.

As explained above, it is possible to vary the concentration of the solid lubricant or the hard particles or fibers in steps within these individual layers of the first part-layer 5 and the second part-layer 6. Instead of the stepped variation, however, it is also possible to vary the concentrations continuously, so that discrete individual layers are no longer distinguishable within the first part-layer 5 and/or the second part-layer 6.

It should also be pointed out that it is not absolutely necessary for the concentrations to be varied in both the first part-layer 5 and the second part-layer 6, and there are embodiments in which there is such a variation in concentration in either the first part-layer 5 or in the second part-layer 6.

It is likewise possible to vary only the concentration of solid lubricant or only the concentration of hard particles or only the concentration of fibers within one of the part-layers 5, 6.

Within the part-layers 5, 6, variations in concentration in the case of the hard substance or hard materials are selected from a range with a lower limit of 5%, in particular 10%, for example 15%, and an upper limit of 50%, in particular 40%, for example 30%, and in the case of the solid lubricant or solid lubricants are selected from a range with a lower limit of 5%, in particular 20%, for example 30%, and an upper limit of 70%, in particular 60%, for example 50%. In the case of the fibers, the concentrations which may be varied within these layers are selected from a range with a lower limit of 0.5%, in particular 5%, for example 10%, and an upper limit of 20%, in particular 17%, for example 15%.

The variations in concentration may be made in 5% or 10% steps, for example.

Another option in embodiments where several solid lubricants or hard particles and/or fibers are contained within the first part-layer 5 and/or the second part-layer 6 is for the variation in concentration to apply to different individual solid lubricants and/or hard particles and/or fibres rather than all of them.

A few examples of anti-friction layers 4 proposed by the invention for the bearing element will be described below.

Example 1

In this instance, the first part-layer 5 is made from a polyamide containing boron nitride or silicon carbide as hard particles in a proportion of 24% by weight to 28% by weight. In order to provide further strengthening and increase thermal conductivity, metal fibers are used in a proportion selected from a range of up to 10% by weight. This first part-layer 5 additionally contains solid lubricants in a proportion of up to 10% by weight and the latter may be $MoS_2$ or graphite.

The second part-layer 6 is made from a polyamide imide with a higher proportion of solid lubricants, in particular $MoS_2$ and/or graphite, and this higher proportion is up to 20% by weight. This layer contains no metal fibers.

Example 2

The bottom part-layer is made from an epoxy resin with 25% of silicon carbide for strengthening the layer and 5% of a solid lubricant, in particular $MoS_2$, h-BN, or $TiO_2$.

The second part-layer 6 is also made from an epoxy resin with approximately 10% silicon carbide and a proportion of 50% of solid lubricants, in particular $MoS_2$ and/or graphite.

Example 3

In this example, the part-layer 5 is a bottom single layer disposed in the region of the bearing metal layer, and a second single layer is disposed on top of it. The first single layer is made from a polyamide imide with hard particles in the form of $Si_3N_4$, SiC and WC in a proportion of 15%. There are no solid lubricants in this first single layer of the part-layer 5.

The second single layer disposed adjacent to the second part-layer 6 is also made from a polyamide imide resin with reinforcing particles, in particular hard particles, such as for example $Si_3N_4$, SiC, WC, in a proportion of 20% as well as 10% of a solid lubricant, in particular $MoS_2$ and/or h-BN. The second part-layer 6 comprises a polyamide imide resin base with 20% of solid lubricant in the form of $MoS_2$ and/or graphite.

Other examples are specified in Table 1 in the appendix. Here, "1" stands for the first part-layer 5 and "2" for the second part-layer 6, and a first and a second part-layer 5, 6 are specified for each example. All figures given in respect of the composition are expressed as a % by weight.

It should be pointed out that the described examples do not restrict the protective scope in any way and the invention also covers all possible combinations apparent from the scope of the claims.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

The embodiments illustrated as examples represent possible design variants of the anti-friction layer 4 and the bearing element 1 and it should be pointed out at this stage that the invention is not specifically limited to the design variants specifically illustrated, and instead the individual design variants may be used in different combinations with one another and these possible variations lie within the reach of the person skilled in this technical field given the disclosed technical teaching. Accordingly, all conceivable design variants which can be obtained by combining individual details of the design variants described and illustrated are possible and fall within the scope of the invention.

For the sake of good order, finally, it should be pointed out that, in order to provide a clearer understanding of the structure of the bearing element 1, it and its constituent parts are illustrated to a certain extent out of scale and/or on an enlarged scale and/or on a reduced scale.

The objective underlying the independent inventive solutions may be found in the description.

Above all, the individual embodiments of the subject matter illustrated in FIG. 1; 2 constitute independent solutions proposed by the invention in their own right. The objectives and associated solutions proposed by the invention may be found in the detailed descriptions of these drawings.

While the invention has been particularly shown and described with reference to particular embodiments, it will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

|  |  | Polymer |  |  |  |  |  |  | Lubricant |  |  | Strength-enhancing additive |  |  | Heat conduction |  |  |
|---|---|---|---|---|---|---|---|---|---|---|---|---|---|---|---|---|---|
| 2 | 1 | 10 |  |  |  |  |  |  |  |  |  |  |  |  |  | 15 |  |
| 1 | 2 | 5 | 30 |  |  |  |  |  |  |  |  |  |  |  |  | 15 | 10 |
| 2 | 1 | 8 | 40 |  |  |  |  |  |  |  |  |  |  |  |  |  | 15 |
| 1 | 2 | 3 | 50 |  |  |  |  |  | 40 |  |  | 10 |  | 5 |  |  |  |
| 2 | 1 | 10 |  | 25 |  |  |  |  |  | 25 |  |  | 15 | 10 |  |  |  |
| 1 | 2 | 8 |  |  | 30 |  |  |  | 5 | 20 | 45 |  | 20 |  |  |  | 15 |
| 1 | 2 | 8 |  |  |  |  | 35 |  | 5 | 25 | 50 | 15 | 20 |  |  |  |  |
| 2 | 1 | 5 | 50 |  |  |  |  |  |  | 45 | 35 | 20 |  |  |  | 5 |  |
| 1 | 2 | 10 |  | 40 |  |  |  |  |  | 50 | 20 | 10 | 20 | 10 |  |  |  |
| 2 | 1 | 10 |  |  |  | 65 |  |  |  | 35 | 30 | 25 |  |  |  |  | 5 |
| 1 | 2 | 5 |  | 55 |  |  |  |  |  | 20 | 15 | 5 | 25 |  |  |  | 20 |
| 2 | 1 | 15 |  | 60 |  |  |  |  |  | 30 | 15 | 45 |  | 5 |  |  |  |
| 1 | 2 | 3 |  |  |  | 55 |  |  |  |  |  |  |  |  |  |  |  |
| 2 | 1 | 10 | 60 |  |  |  |  |  |  |  | 15 | 35 | 25 |  |  |  |  |
| 1 | 2 | 10 |  | 65 |  |  |  |  |  |  |  | 25 | 30 | 5 |  | 15 |  |
| 2 | 1 | 3 |  |  |  |  |  | 35 |  |  |  |  |  |  |  |  | 10 |
| 1 | 2 | 8 |  |  |  |  | 40 |  |  | 10 | 25 | 30 |  | 20 | 5 |  |  |
| 2 | 1 | 8 |  |  |  |  | 50 |  |  |  |  |  | 15 | 25 |  | 35 | 20 |
| 1 | 2 | 5 |  |  |  |  |  | 65 |  |  | 25 |  |  |  |  |  |  |
| 2 | 1 | 10 |  |  |  |  |  |  | 10 | 30 |  | 20 | 10 | 5 | 5 |  |  |
| 1 | 2 | 8 |  |  |  |  |  |  |  | 15 | 30 |  | 25 |  |  |  | 5 |
| 2 | 1 | 5 |  |  | 25 |  |  |  |  | 10 | 15 | 25 | 5 | 25 | 25 |  |  |
| 1 | 2 | 8 |  |  |  | 60 |  |  |  | 25 | 20 | 20 |  |  | 5 | 35 |  |
| 2 | 1 | 5 |  |  | 30 |  |  |  |  | 20 | 25 | 5 | 25 |  | 20 |  | 5 |
| 1 | 2 | 8 |  |  |  | 50 |  |  |  | 15 | 10 |  |  |  | 5 |  | 20 |
| 2 | 1 | 3 |  |  |  |  |  |  |  | 10 | 30 |  |  | 5 | 20 | 15 |  |
| 1 | 2 | 8 |  |  |  |  |  |  |  | 15 |  |  |  | 40 |  | 35 |  |
| 2 | 1 | 5 |  |  |  |  | 45 |  |  | 5 |  | 20 |  |  |  | 10 |  |
| 1 | 2 | 15 |  |  |  | 30 |  |  |  | 20 | 15 | 5 |  | 10 | 10 | 15 | 5 |
| 1 | 2 | 8 |  |  |  |  |  |  |  | 20 | 25 | 5 |  | 20 | 5 | 10 | 5 |
| 2 | 1 | 3 |  |  |  |  |  |  | 15 | 5 | 40 | 35 |  |  |  |  | 20 |
| 1 | 2 | 10 |  |  |  |  |  |  |  | 30 | 25 | 40 |  |  |  |  |  |
| 2 | 1 | 5 |  |  |  |  | 45 |  |  | 15 | 45 |  |  |  |  |  |  |
| 1 | 2 | 15 |  |  |  |  |  |  |  | 25 | 40 |  |  |  |  | 20 |  |
| 2 | 1 | 3 |  | 25 |  |  |  |  |  |  | 15 |  |  |  | 25 |  | 15 |
| 1 | 2 | 8 |  | 15 |  |  |  |  |  |  |  |  |  |  | 5 |  | 20 |
| 2 | 1 | 15 |  | 25 |  |  |  |  |  |  |  |  |  |  |  | 20 | 15 |

-continued

| | | | Polymer | | | | Lubricant | | | | Strength-enhancing additive | | | | Heat conduction | | |
|---|---|---|---|---|---|---|---|---|---|---|---|---|---|---|---|---|---|---|
| 2 | 10 | 30 | | | | | | | | | | | | | | | | |
| 1 | 8 | 20 | | | | | | | | | | | | | | | | |
| 2 | 10 | | | | | 35 | 25 | 15 | 25 | | 45 | | | 40 | 15 | | | |
| 1 | 3 | | | 45 | | | | 15 | | | | | | 25 | | | | |
| 2 | 10 | 25 | | | | | | 35 | 35 | | | | | 20 | | | | |
| 1 | 10 | | | | | 55 | 35 | 20 | | 35 | | 5 | | | | | | 40 |
| 2 | 8 | 30 | | | | | | 40 | | | | 10 | | | | | 35 | 25 |
| 1 | 3 | 60 | | | | 70 | | | 5 | | | | | | | | | 20 |
| 2 | 10 | 30 | | | | | | 15 | | | | 15 | | 20 | | | 10 | 30 |
| 1 | 8 | | | | 60 | | | 20 | | | | | | | | | | |
| 2 | 10 | 35 | | | | | | | | | | | 15 | | 10 | | | 5 |
| 1 | 15 | | | 45 | | | | 35 | | | 15 | | 35 | | 5 | | | |
| 2 | 15 | 35 | | | | | 40 | 10 | | | | 10 | | | | | | 25 |
| 1 | 3 | | | | | | | 45 | | | | | | | | | 40 | |
| 2 | 15 | 40 | | | | | | 10 | | | | 15 | 20 | | | | | 5 |
| 1 | 10 | | | | | | | 5 | | | | | 30 | | | | 35 | |
| 2 | 10 | 40 | | | | 25 | | 25 | 50 | | | 25 | | | | 20 | 5 | 10 |
| 1 | 8 | | | | | 60 | 30 | 10 | | 20 | 55 | 5 | | 20 | | 5 | | |
| 2 | 15 | 45 | | | | | | 25 | | | | 15 | | | | | | |
| 1 | 3 | | | | | 20 | | 10 | | 55 | | | | 5 | 15 | | | |
| 2 | 15 | 45 | | | | | | 20 | | | | | | | | | | |
| 1 | 5 | | | | | | 30 | | | | 10 | | | | | | | |
| 2 | 10 | 50 | | | | | | 10 | | | | | | 25 | 20 | 15 | | |
| 1 | 15 | | | | | | 25 | 35 | | | | | | 20 | 5 | | 40 | 25 |
| 2 | 5 | 55 | | | | | | 35 | | 25 | | | | 35 | | | 5 | 5 |
| 1 | 10 | | | | | 65 | | 15 | | 5 | 25 | 10 | | | 30 | | | 35 |
| 2 | 5 | | 25 | | | | | 10 | | | | | | 35 | 10 | 20 | | |
| 1 | 15 | | | | | 40 | | 50 | | | | | | | | | | 5 |
| 2 | 8 | | 35 | | | | | 20 | 15 | | | | | | 45 | | | |
| 1 | 15 | | | | | | | 35 | | | | | | | | | | |
| 2 | 8 | | | 45 | | | | 15 | | | | 10 | | 10 | | | | |
| 1 | 5 | | | | | | | 55 | | | | | | | | | | |
| 2 | 15 | | 35 | | | | | 5 | | | | | | | 45 | | | |
| 1 | 5 | | 40 | | | | | 5 | | 50 | | | | | | 10 | | |

-continued

| | | Polymer | Lubricant | Strength-enhancing additive | Heat conduction |
|---|---|---|---|---|---|
| 2 | 5 | | | | |
| 1 | 10 | 45 | | | |
| 2 | 8 | 50 | | | |
| 1 | 15 | 65 | | | |
| 2 | 10 | | 25 | | |
| 1 | 8 | | 15 | 45 | |
| 2 | 3 | 35 | | | |
| 1 | 8 | | 25 | | |
| 2 | 5 | 20 | 10 | | |
| 1 | 10 | 30 | 25 | | |
| 2 | 5 | | 5 | 15 | |
| 1 | 10 | 65 | 40 | | |
| 2 | 3 | | 10 | 15 | |
| 1 | 8 | | 5 | | 15 |
| 2 | 15 | | 25 | | 20 |
| 1 | 5 | 40 | 45 | 35 | |
| 2 | 15 | | | 25 | |
| 1 | 5 | | 45 | 25 | 5 |
| 2 | 3 | | 25 | | |
| 1 | 8 | 30 | 30 | 40 | 5 |
| 2 | 15 | 40 | | | |
| 1 | 5 | 75 | 10 | 25 | |
| 2 | 15 | | | 15 | 5 |
| 1 | 5 | 55 | 25 | 0, 1 | |
| 2 | 15 | 35 | | | |
| 1 | 3 | | | 25 | |
| 2 | 8 | 25 | 20 | 45 | |
| 1 | 3 | 60 | | 20 | |
| 2 | 8 | | 40 | 25 | 5 |
| 1 | 15 | 65 | 65 | 10 | 10 |
| | | | | 25 | 15 |
| | | | | 10 | |

LIST OF REFERENCE NUMBERS

1 Bearing element
2 Supporting metal layer
3 Bearing metal layer
4 Anti-friction layer
5 Part-layer
6 Part-layer
7 Intermediate layer

What is claimed is:

1. An anti-friction layer for a plain bearing comprising a synthetic polymer layer, wherein the polymer layer comprises at least a first part-layer and a second part-layer with a different composition than the first-part layer, the first part-layer contains at least one solid lubricant in a proportion selected from a range with a lower limit of 5% by weight and an upper limit of 20% by weight, and the second part-layer contains at least one solid lubricant in a proportion selected from a range with a lower limit of 15% by weight and an upper limit of 50% by weight, the proportion of the at least one solid lubricant in the second part-layer is higher than in the first part-layer, and the second part-layer serves as mating face for a component to be mounted.

2. The anti-friction layer as claimed in claim 1, wherein the synthetic polymer layer comprises a resin or lacquer layer.

3. The anti-friction layer as claimed in claim 1, wherein the first part-layer is harder than the second part-layer.

4. The anti-friction layer as claimed in claim 1, wherein the first part-layer has a Vickers hardness selected from a range with a lower limit of EV2 35 and an upper limit of EV2 60.

5. The anti-friction layer as claimed in claim 1, wherein the second part-layer has a Vickers hardness selected from a range with a lower limit of EV2 25 and an upper limit of EV2 45.

6. The anti-friction layer as claimed in claim 1, wherein the first part-layer contains at least one hard material.

7. The anti-friction layer as claimed in claim 6, wherein the proportion of the at least one hard material in the first part-layer is selected from a range with a lower limit of 5% by weight and an upper limit of 50% by weight.

8. The anti-friction layer as claimed in claim 6, wherein the hard material is selected from a group comprising $CrO_3$, $Fe_3O_4$, PbO, ZnO, CdO, $Al_2O_3$, Sic, $Si_3N_4$, $SiO_2$, MnO, $Si_3N_4$, clay, talc, $TiO_2$, aluminium silicates, magnesium silicates, spheroidal carbon, carbides, metal particles, AlN, $Fe_3P$, metal borides, metal sulphides, chlorinated hydrogen carbonates, fluorides, metal fluorides, metal oxy-fluorides, crocidolite, tremolite, molybdenum thio-carbamates, silicides, thio-phosphates, as well as mixtures thereof.

9. The anti-friction layer as claimed in claim 6, wherein the proportion of hard material in the first part-layer decreases in the direction towards the second part-layer.

10. The anti-friction layer as claimed in claim 1, wherein the second part-layer contains a hard material in a proportion selected from a range with a lower limit of 2% by weight and an upper limit of 50% by weight.

11. The anti-friction layer as claimed in claim 10, wherein the proportion of hard material in the second part-layer increases in the direction towards the first part-layer.

12. The anti-friction layer as claimed in claim 1, wherein the first and/or second part-layer contain fibers.

13. The anti-friction layer as claimed in claim 12, wherein the proportion of the fibers in the first part-layer is selected from a range with a lower limit of 5% by weight and an upper limit of 20% by weight.

14. The anti-friction layer as claimed in claim 12, wherein the proportion of the fibers in the second part-layer is selected from a range with a lower limit of 0.05% by weight and an upper limit of 10% by weight.

15. The anti-friction layer as claimed in claim 1, wherein the at least one solid lubricant is selected from a group comprising $MoS_2$, h-BN, $WS_2$, graphite, polytetrafluoroethylene, Pb, Pb—Sn-alloys, $CF_2$, $PbF_2$, as well as mixtures thereof.

16. The anti-friction layer as claimed in claim 1, wherein the polymer of the first and/or second part-layer is selected from a group comprising polytetrafluoroethylene, perfluoro-alkoxy copolymers, polyfluoro-alkoxy polytetrafluoroethylene copolymers, ethylene-tetrafluoroethylene, polychlorotrifluoroethylene, fluorinated ethylene-propylene copolymers, polyvinyl fluoride, polyvinylidene fluoride, alternating copolymers, perfluoroethylene propylene, polyester imides, bismaleimides, polyimide resins, aromatic polyimide resins, hydrogen-free polyimide resins, poly-triazo-pyromellithimides, polyamide imide, aromatic polyamide imide, polyarylether imides, polyarylether imidies modified with isocyanates, polyether imide, polyether imide modified with isolyinates, epoxy resins, epoxy resin esters, phenolic resins, polyamide 6, polyamide 66, polyoxymethylene, silicones, polyaryl ethers, polyaryl ketones, polyaryl ether ketones, polyaryl ether-ether ketone, polyether-ether ketones, polyether ketones, polyvinylidene difluorides, polyethylene sulfides, allylene sulfide, poly-triazo-pyromellithimides, polyester imides, polyaryl sulfides, polyvinylene sulfides, polyphenylene sulfides, polysulfones, polyether sulfones, polyaryl sulfones, polyaryl oxides, polyaryl sulfides, nitrile rubber, fluorine-based rubbers, mixtures and copolymers thereof.

17. The anti-friction layer as claimed in claim 1, wherein the proportion of solid lubricant in the first part-layer increases in the direction towards the second part-layer.

18. The anti-friction layer as claimed in claim 1, wherein the proportion of solid lubricant in the second part-layer decreases in the direction towards the first part-layer.

19. The anti-friction layer as claimed in claim 1, wherein the first part-layer is made up of several individual layers of different compositions.

20. The anti-friction layer as claimed in claim 1, wherein the second part-layer is made up of several individual layers of different compositions.

21. The anti-friction layer as claimed in claim 1, wherein at least one adhesion imparting agent is disposed between the part-layers or between at least two individual layers of the part-layers.

22. A plain bearing with a supporting metal layer, a bearing metal layer disposed on top of it and an anti-friction layer disposed on top of the latter, comprising the anti-friction layer as claimed in claim 1, and the first part-layer is disposed between the second part-layer and the bearing metal layer.

* * * * *

UNITED STATES PATENT AND TRADEMARK OFFICE
CERTIFICATE OF CORRECTION

PATENT NO.         : 7,942,581 B2
APPLICATION NO.    : 11/832934
DATED              : May 17, 2011
INVENTOR(S)        : Georg Leonardelli Page 1 of 1

It is certified that error appears in the above-identified patent and that said Letters Patent is hereby corrected as shown below:

In the Claims

Claim 1, Column 19, line 23, after "as" insert -- a --.
Claim 4, Column 19, line 31, both occurrences of "EV2" should read -- HV2 --.
Claim 5, Column 19, line 34, both occurrences of "EV2" should read -- HV2 --.

Signed and Sealed this
Tenth Day of February, 2015

Michelle K. Lee
*Deputy Director of the United States Patent and Trademark Office*